May 1, 1962     R. W. ROBERTS, JR., ET AL     3,032,679
PASSIVE ELECTRONIC SWITCHING FOR OSCILLOSCOPES
Filed Nov. 9, 1959
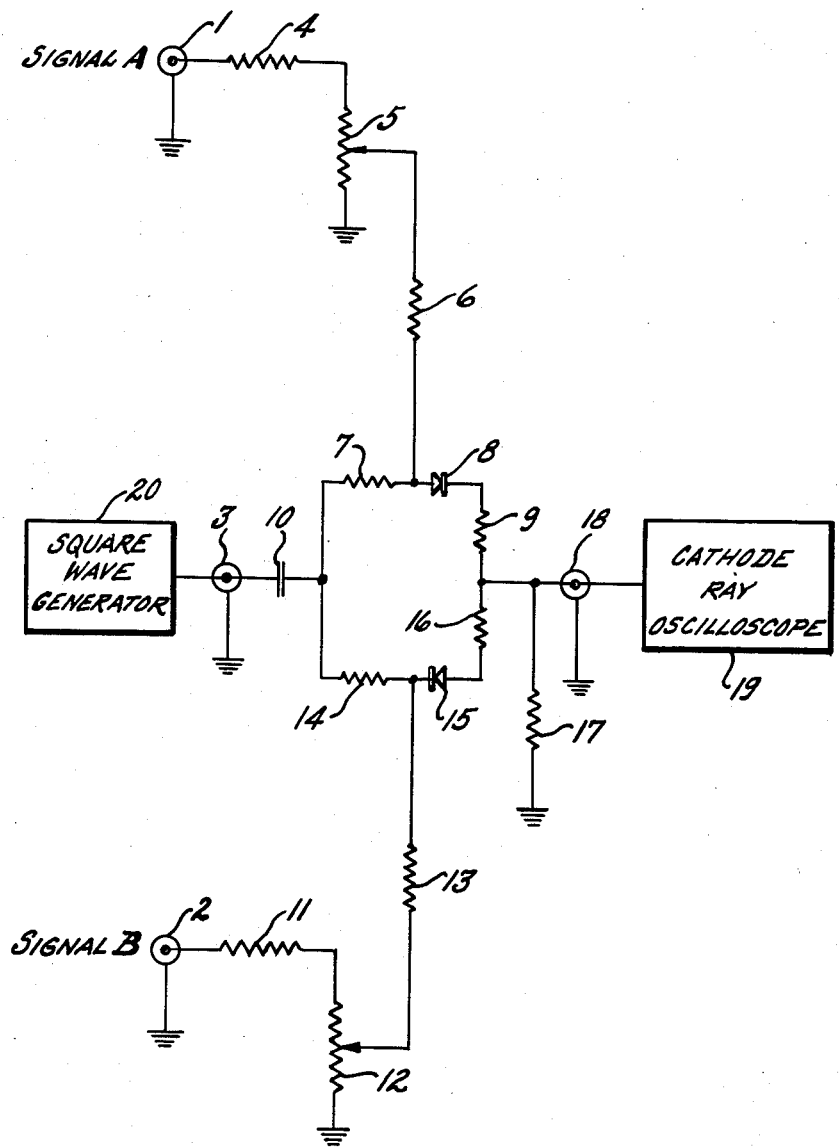
INVENTORS
ROY W. ROBERTS Jr.
AND BENJAMIN R. CAPONE
BY Wade Koontz
George Fine
ATTORNEYS United States Patent Office 3,032,679
Patented May 1, 1962

3,032,679
PASSIVE ELECTRONIC SWITCHING FOR OSCILLOSCOPES
Roy W. Roberts, Jr., Sunnyvale, Calif., and Benjamin R. Capone, Winthrop, Mass., assignors to the United States of America as represented by the Secretary of the Air Force
Filed Nov. 9, 1959, Ser. No. 851,923
5 Claims. (Cl. 315—26)
(Granted under Title 35, U.S. Code (1952), sec. 266)

The invention described herein may be manufactured and used by or for the United States Government for governmental purposes without payment to us of any royalty thereon.

This invention relates to an electronic switch and, in particular, to a passive element electronic switch to be utilized with a single channel cathode ray oscilloscope to view two signals simultaneously.

In many applications, it is highly desirable to view two differing signals simultaneously for comparison or measurement purposes. In the prior art, one method of accomplishing the desired result was to apply the signals to a dual channel cathode ray oscilloscope. The tube of the cathode ray oscilloscope is provided with dual beams so that upon the face of the tube there is displayed aforesaid two signals simultaneously, one of the viewed signals being displaced vertically from the other. It is to be noted that there exists other methods and means utilizing a dual beam cathode ray oscilloscope for viewing two signals simultaneously.

The present invention provides a passive element electronic switch which when used with a single beam cathode ray oscilloscope permits two differing signals to be viewed simultaneously, one of the signals being displaced vertically from the other.

The novel switching means is comprised of two diodes placed in parallel between a square wave signal input and output, wherein the two diodes alternately conduct the positive and negative half cycles of the square wave. One of the two differing signals is connected between the input and one of aforesaid diodes, and the other of the two differing signals is connected between the input and the other of the two diodes. Accordingly, one of the two differing signals is superimposed on one half of aforesaid square wave signal, the other of the two differing signals is superimposed on the other half of aforesaid square wave signal. The two superimposed signals are then displayed on the face of a cathode ray oscilloscope and one of the superimposed signals is displaced vertically from the other by a distance proportional to the peak to peak voltage of aforesaid square wave signal.

The novel passive element electronic switch is extremely small, light weight and inexpensive having no tubes, transistors, power supplies or transformers.

An object of the present invention is to provide a novel passive element electronic switch utilized in combination with a single beam cathode ray oscilloscope to permit a simultaneous viewing of two signals, one of aforesaid signals being displaced vertically from the other.

Another object of the present invention is to provide a square wave control signal having one input signal superimposed on the positive portion thereof and another input signal superimposed upon the negative portion thereof and a cathode ray oscilloscope displaying simultaneously both of said superimposed signals.

A still further object of the present invention is to provide a single beam cathode ray oscilloscope to display a pair of signals, one of the signals being displaced vertically from the other by utilizing a passive element electronic mixer, in which one of the pair of signals is superimposed on the positive portion of a square wave and then the other of the pair of signals is superimposed on the negative portion of aforesaid square wave, both superimposed signals then being displayed on the face of the oscilloscope.

The various features of novelty which characterize this invention are pointed out with particularity in the claims annexed to and forming a part of this specification. For a better understanding of this invention, however, its advantages and specific objects obtained with its use, reference should be had to the accompanying drawings and descriptive matter in which is illustrated and described a preferred embodiment of the invention.

Referring now to the drawing, there is shown input terminals 1 and 2 adapted to receive signal inputs A and B respectively. Terminal 3 is adapted to receive a square wave input signal from square wave source 20 which is then fed to the anode of diode 8 by way of capacitor 10 and resistor 7. The square wave signal is also fed to the cathode of diode 15 by way of capacitor 10 and resistor 14.

Signal A is fed to anode diode 8 by way of resistor 4, potentiometer 5, and resistor 6. Signal B is fed to the cathode of diode 15 by way of resistor 11, potentiometer 12 and resistor 13. The output signal from the cathode of diode 8 is fed to terminal 18 by way of resistor 9 and its potential is developed across resistor 17. The output signal from the anode of diode 15 is fed to terminal 18 by way of resistor 16 and its potential is developed across resistor 17.

In the operation of the circuit of the passive element electronic switch shown in the drawing, signal A is applied to terminal 1 and signal B is applied to terminal 2. A square wave input voltage is fed into terminal 3 and serves to switch diodes 8 and 15 off and on. During the positive half cycles of the square wave voltage, the output voltage at terminal 18 consists of the positive half of the square wave voltage plus signal A. During the negative half of the square wave voltage, the output voltage at terminal 18 consists of the negative half of the square wave voltage plus signal B.

The output voltages are applied to a single beam cathode ray oscilloscope 19 and are displayed on the face thereof. Oscilloscope 19 is of the conventional single beam type wherein signals to be viewed on the face of its associated cathode ray tube are received at the conventional oscilloscope input. The oscilloscope input signals are then applied in the normal fashion to the vertical plates of the aforementioned associated cathode ray tube by way of the oscilloscope vertical amplifier. Signals A and B are viewed simultaneously and are displaced vertically by a distance proportional to the peak-to-peak voltage of the square wave voltage input to terminal 3.

Adjustment of the individual amplitudes of signals A and B are obtained by adjusting potentiometers 5 and 12 respectively. Separation of the traces of signals A and B can be accomplished either by varying aforesaid potentiometers or by varying the amplitude of the square wave voltage applied to terminal 3.

Since a square wave voltage input is utilized, it will appear at output terminal 18 as a direct current voltage with a signal superimposed thereon. In the usual case, square wave voltage input and signals A and B will not be harmonic multiples of each other. In this instance, the signal voltages will progress along the square wave voltage at a beat frequency and the effect on the face of the cathode ray tube of the oscilloscope is to effectively fill in the gaps in each signal trace caused by the switching of the diodes to give a continuous trace for each signal. This beating of the square wave voltage and the signal frequencies also allows the passive element electronic switch to be used for observation of signal frequencies much higher as well as lower than the frequency of the square wave voltage.

In the aforementioned operation, the square wave voltage was applied at 1000 cycles per second. The single beam oscilloscope has been utilized to observe 15,000 c.p.s. signals with excellent results. It has also been used to observe signals of 20 c.p.s. with equally good results.

While in accordance with the provisions of the statutes, we have illustrated and described the best form of the invention now known to us, it will be apparent to those skilled in the art that changes may be made in the form of the apparatus disclosed without departing from the spirit of the invention as set forth in the appended claims, and that in some cases certain features of the invention may sometimes be used to advantage without a corresponding use of other features.

Having now described our invention, what we claim as new and desire to secure by Letters Patent, is as follows:

1. A passive electronic switch in combination with a cathode ray oscilloscope, for viewing a pair of signals simultaneously on the face of cathode ray tube associated with said oscilloscope, one of said signals being displaced vertically from the other, comprising a pair of diodes, each of said diodes having a cathode and anode, a square wave voltage source, means to cause one of said diodes to conduct during the positive half of said square wave voltage, means to cause the other of said diodes to conduct during the negative half of said square wave voltage, means to superimpose one of said pair of signals on said positive half of said square wave voltage, means to superimpose the other of said pair of signals on said negative half of said square wave voltage, and means to display both of said superimposed signals on said face of said cathode ray tube.

2. A passive electronic switch in combination with a single beam cathode ray oscilloscope for viewing a pair of signals simultaneously on the face of cathode ray tube associated with said oscilloscope, comprising a square wave voltage source, a pair of diodes, each of said diodes having a cathode and anode, means to superimpose one of said pair of signals on the positive half of said square wave voltage, means to superimpose the other of said signals on the negative half of said square wave voltage, means to cause one of said diodes to conduct only on said positive half of said square wave voltage, means to cause the other of said diodes to conduct only said negative half of said square wave voltage, and means to apply the output signal from each of said diodes to said cathode ray oscilloscope for simultaneous viewing thereof upon the face of said associated cathode ray tube.

3. A passive electronic switch in combination with a single beam cathode ray oscilloscope for viewing a pair of signals simultaneously on the face of the cathode ray tube associated with said oscilloscope, comprising a square wave voltage source, a pair of diodes, each of said diodes having a cathode and anode, means to apply one of said pair of signals to said anode of one of said pair of diodes, means to apply the other of said pair of signals to said cathode of the other of said diodes, means to cause one of said diodes to conduct only during the positive half of said square wave voltage, means to cause the other of said diodes to conduct during the negative half of said square wave voltage, and means to display on said face of said cathode ray tube the output voltage of each of said diodes.

4. A passive electronic switch in combination with a single beam cathode ray oscilloscope for viewing a pair of signals simultaneously on the face of the cathode ray tube associated with said oscilloscope, comprising a pair of diodes, each of said diodes having a cathode and anode, a square wave voltage source, means to impress one of said pair of signals on said anode of one of said diodes, means to impress the other of said signals on said cathode of the other of said diodes, means to cause said pair of diodes to alternately conduct the positive and negative half cycles of said square wave voltage, and means to impress the output voltages from said pair of diodes upon said oscilloscope for simultaneous viewing upon the face of said associated cathode ray tube.

5. A passive electronic switch in combination with a cathode ray oscilloscope for viewing a pair of signals simultaneously on the face of the cathode ray tube associated with said oscilloscope, comprising a square wave voltage source, a pair of diodes, each of said diodes having a cathode and anode, a first pair of resistance means interconnecting one of said anodes to one of said cathodes, a second pair of resistance means interconnecting the other of said anodes to the other of said cathodes, capacitor means to apply said square wave voltage to the junction of said first pair of resistance means, first means to apply one of said pair of signals to one of said anodes of one of said pair of diodes, second means to apply the other of said signals to said cathode of the other of said pair of diodes, and means to apply the output voltages from the junction of said second pair of resistance means to said oscilloscope for a simultaneous viewing of said pair of signals on said face of said associated cathode ray tube.

References Cited in the file of this patent

UNITED STATES PATENTS

| | | |
|---|---|---|
| 2,459,181 | Rosen | Jan. 18, 1949 |
| 2,466,207 | Carpentier | Apr. 5, 1949 |
| 2,871,404 | Mugele | Jan. 27, 1959 |